July 4, 1972   B. C. BERGUM ET AL   3,674,565
MULTICELL BATTERY HAVING DOUBLE ADHESIVE, LIQUID SEALING WINDOW
Filed Dec. 21, 1970   2 Sheets-Sheet 1
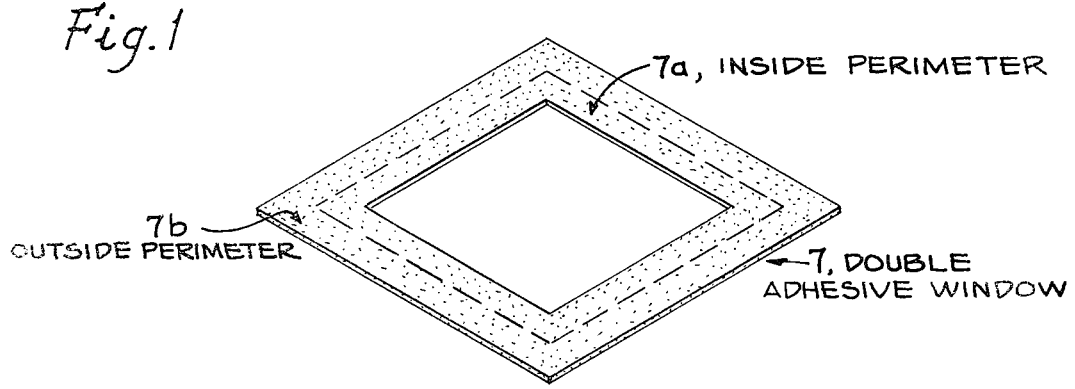
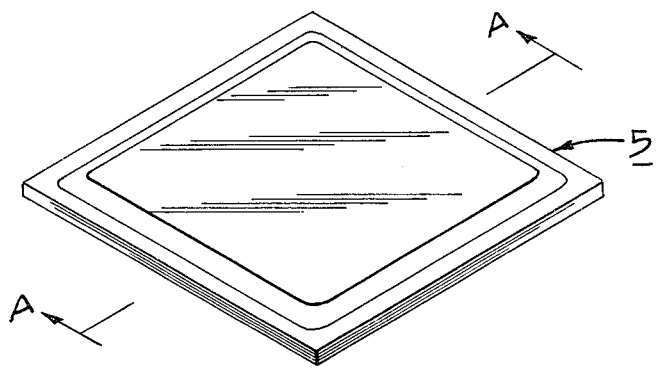
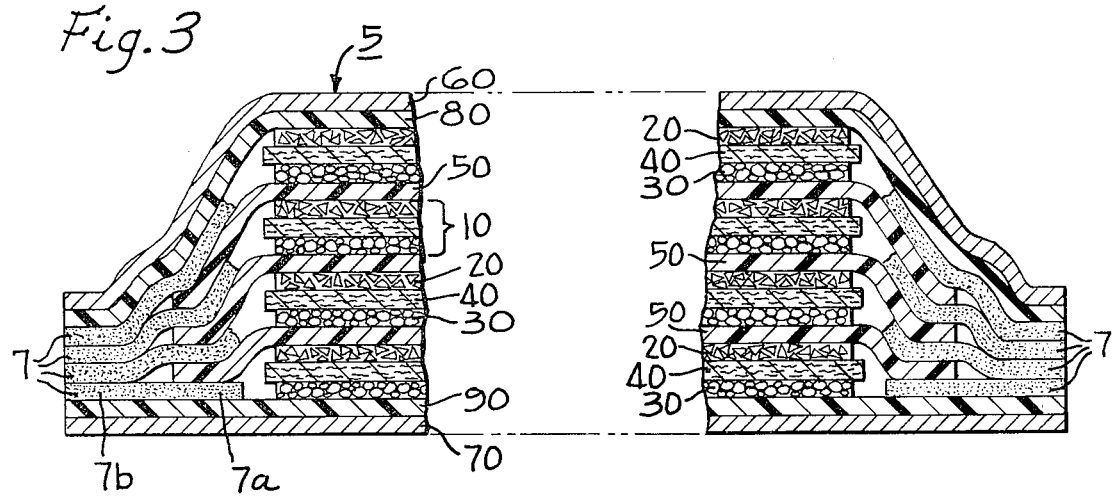

United States Patent Office 3,674,565
Patented July 4, 1972

3,674,565
MULTICELL BATTERY HAVING DOUBLE
ADHESIVE, LIQUID SEALING WINDOW
Bernard C. Bergum, Monona, and Kenneth H. Kenyon,
Madison, Wis., assignors to ESB Incorporated
Filed Dec. 21, 1970, Ser. No. 99,984
Int. Cl. H01m 21/00
U.S. Cl. 136—111
9 Claims

ABSTRACT OF THE DISCLOSURE

Around each cell of a multicell battery is a window, both sides of which are adhesive. The inside perimeter of each window, which overlaps a portion of the intercell connector between two adjacent cells, provides a first seal around a cell to prevent liquid from one cell from migrating either to another cell or to the exterior of the battery. The outside perimeter of each window extends beyond the edges of the intercell connector to provide a second seal which also prevents liquids from migrating from the interior to the exterior of the battery. The windows may be electrical insulators which serve the additional function of keeping electrically conductive intercell connectors and/or liquid impervious layers from coming into electrical contact with each other.

BACKGROUND OF THE INVENTION

Windows have surrounded the cells in single cell batteries for the purpose of providing a liquid-tight seal around the perimeter of the cell and/or to prevent various electrically conductive members of the batteries from coming into undesired contact with each other. See for example U.S. Pat. 3,353,999 in which a non-conductive window or spacer is used both to retain electrolyte within a cell and to provide electrical insulation between the anode current collector and the cathode. In U.S. Pat. 3,421,944, a non-conductive window or frame is used to insulate the electrodes from each other and also to contain the electrolyte. In U.S. Pat. 3,494,796, deposits of non-conductive adhesive analagous to a window are first applied around the electrodes and are subsequently impregnated into the perimeter of a separator in a first cell to prevent electrolyte from that cell from migrating to a second cell which is structurally connected to the first cell.

In multicell batteries, the problems of preventing liquid migrations are more numerous than in a single cell battery. Electrolyte may migrate from one cell to another around the perimeters of the intercell connectors, causing short circuits between those cells. Electrolyte and liquid products of discharge may escape from the interior to the exterior of the battery around the battery perimeter, resulting in decreased battery performance in the case of electrolyte loss and possibly resulting in corrosion, poisoning, or other harmful consequences where either electrolyte or battery discharge products escape.

The problems of preventing conductive members from coming into undesired electrical contact with each other are also more numerous in multicell batteries. Where the components which divide one cell from another are electrically conductive, these must be kept out of electrical contact with each other. Where the liquid impervious layer surrounding the cells is conductive, the pieces of that layer must be kept from making electrical contact with each other or with any of the components which divide cells from one another.

SUMMARY OF THE INVENTION

This invention places around each cell of a multicell battery a window, both sides of which are adhesive. The inside perimeter of each window, which overlaps a portion of the intercell connector between two adjacent cells, provides a first seal around a cell to prevent liquid from one cell from migrating either to another cell or to the exterior of the battery. The outside perimeter of each window extends beyond the edges of the intercell connector to provide a second seal which also prevents liquids from migrating from the interior to the exterior of the battery. The windows may be electrical insulators which serve the additional function of keeping electrically conductive intercell connectors and/or liquid impervious layers from coming into electrical contact with each other. The peripheral edges of the liquid impervious layer which surrounds the cells and intercell connectors may be recessed behind, be conterminous with, or extend beyond the peripheral edges of the outside perimeter of the window. Although the battery containing this invention may employ any electrochemical system, a preference for the LeClanche system is stated.

BRIEF DESCRIPTION OF THE DRAWINGS

FI1. 1 is a pictorial view of the double adhesive window of this invention.

FIG. 2 is a pictorial view of a multicell battery containing four of the double adhesive windows of this invention.

FIG. 3 is a cross-section of the battery shown in FIG. 2, taken along the line A—A of FIG. 2. FIG. 3 illustrates the position of the double adhesive windows within the multicell battery. The thickness of the battery shown in FIG. 3 is greatly magnified for purposes of illustration.

DESCRIPTION OF THE PREFERRED EMBODIMENTS

Figure 4:
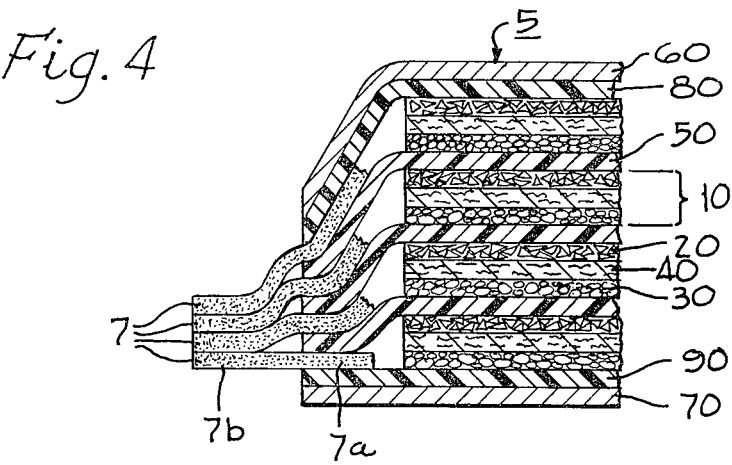
FIG. 4 is a cross-section which illustrates another embodiment of the invention.

FIG. 1 shows the window 7 with which this invention is concerned. This window, when assembled in a multicell battery 5 such as the one illustrated in FIGS. 2 and 3, is adhesive on both of its sides. The window is in the form of a closed loop, a loop of rectangular configuration being shown for purposes of illustration, and inside the loop is an open space. The window 7 may be considered to have an inside perimeter 7a and an outside perimeter 7b, with the imaginary dividing line between the two perimeters being at any desired location.

FIG. 3 shows a multicell battery employing the windows 7. As FIG. 3 shows, the battery 5 comprises a stack of at least two cells 10, each such cell comprising a positive electrode 20, a negative electrode 30, and an electrolyte impregnated separator 40 between the electrodes. Between each adjacent pair of cells 10 is a liquid impervious intercell connector 50, the edges of which extend beyond the edges of the electrodes and separators of the adjacent cells. Surrounding the cells and the intercell connectors is a liquid impervious layer comprising members 80 and 90. Although they are not required by the present invention, members 60 and 70 are also shown in FIG. 3 on the outside of the liquid impervious layer, the members 60 and 70 being made from metal and functioning as vapor barriers and possibly also as current collectors.

This invention consists of placing a window 7 around each cell 10 so that the inside perimeter 7a of each window overlaps a portion of an intercell connector 50 and thereby produces a first seal around the enclosed cell and so that the outside perimeter 7b extends beyond the edges of the intercell connector 50 where it is sealed to produce a second seal. As can be seen in FIG. 3, the inside perimeters 7a of the windows 7 surrounding the cells 10 at the ends of the stack of cells are between the liquid impervious layers 80 and 90 and an intercell connector, while the inside perimeters 7a of the windows 7 which surround any additional cells are between two intercell connectors. Each of the inside perimeters 7a is sealed on both of its faces, thereby providing a first seal around the enclosed cell which prevents liquid from migrating either to another cell or to the exterior of the battery. Each of the outside perimeters 7b is also sealed on both of its faces, thereby providing a second seal around the enclosed cell which prevents liquids from migrating from the interior to the exterior of the battery. Thus, each window 7 provides two seals around each cell, providing a double barrier against liquid migration.

Figure 5:
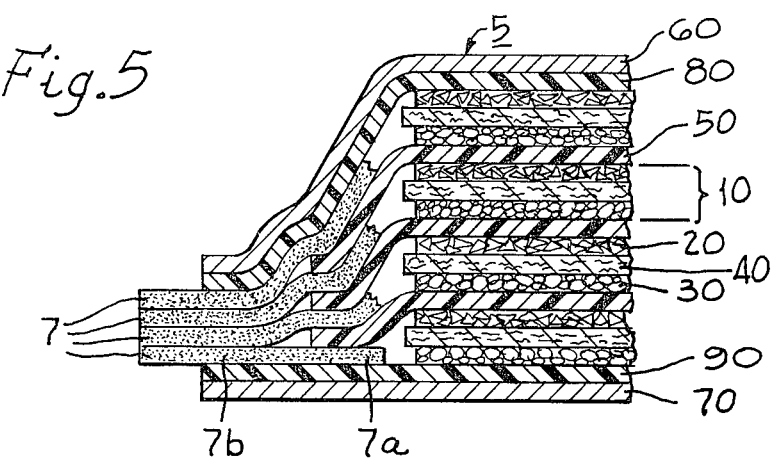
FIG. 5 is a cross-section which illustrates still another embodiment of the invention.
Figure 6:
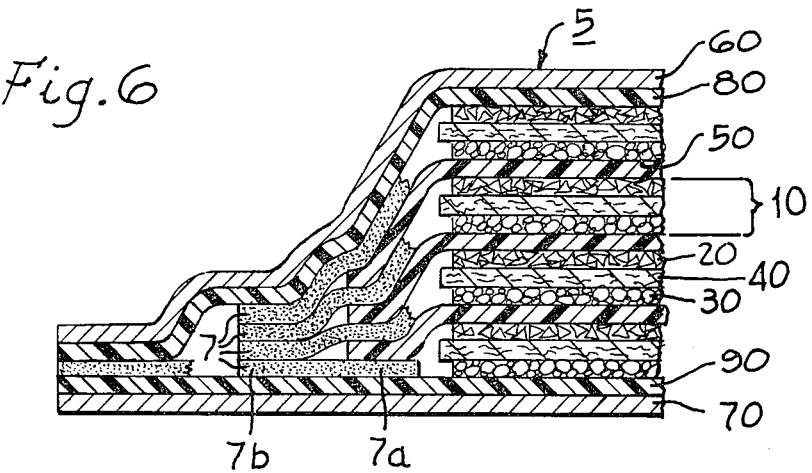
FIG. 6 is a cross-section which illustrates a still further embodiment of the invention.

It will be noted that the embodiment of the invention illustrated in FIG. 3 is one in which the peripheral edges of both the liquid impervious layers 80 and 90 and the window 7 extend beyond the edges of the intercell connectors and are conterminous with each other. Other embodiments are illustrated in FIGS. 4 through 6. In FIG. 4, the peripheral edges of the windows 7 extend beyond the edges of the liquid impervious layers 80 and 90, those layers being conterminous with the intercell conductors 50. The construction shown in FIG. 5, is like that shown in FIG. 4, one in which the peripheral edges of the windows 7 extend beyond the edges of the layers 80 and 90, but (like the construction shown in FIG. 3) the peripheral edges of the layers 80 and 90 extend beyond the edges of the intercell connectors. FIG. 6 shows a construction in which the peripheral edges of the layers 80 and 90, as well as those of vapor barriers 60 and 70, extend beyond the peripheral edges of the windows. Nonconductive adhesive 100 is shown between layers 80 and 90 to seal them together. In all of the constructions shown in FIGS. 3 through 6, it will be noted that each window 7 has an inside perimeter 7a which overlaps a portion of at least one intercell connector 50 to produce a first seal around the enclosed cell, while each window 7 also has an outside perimeter 7b which extends beyond the edges of the intercell connector 50 where it is again sealed to produce a second seal.

Each window 7 may, if desired, also be used as an electrical insulator which prevents electrically conductive members of the battery from coming into unwanted contact with each other. For instance, one of the requirements in a multicell battery is that electrical current must be conducted between the positive electrode 20 on one side of the intercell connector 50 and the negative electrode on the other side of the same intercell connector. The means used to achieve this conduction will depend upon the particular construction of the intercell connector 50. The particular intercell connector 50 shown in FIG. 3 comprises a single member made from an electrically conductive plastic, a construction in which that member serves as the necessary current conducting means. The intercell connector 50 might also comprise other electrically conductive single members such as metal sheets or foils, or it might collectively comprise two or more members each of which is conductive. Alternatively, intercell connector 50 might comprise the combination of a non-conductive member and one or more conductive members which extend through or around the edge of the non-conductive member. Where the portions of the intercell connectors overlapped by the windows are electrically conductive, the window should be electrically non-conductive.

Another electrical requirement of the battery is that current be conducted between the positive electrode 20 at one end of the battery and the exterior of the liquid impervious layer 80 and also between the negative electrode 30 at the other end of the battery and the exterior of the liquid impervious layer 90. The means used to achieve these conductions will depend in part upon the electrical properties of the layers 80 and 90. If the layers themselves are conductive and if they will not cause any undesired electrochemical reactions with other components of the battery, then the layers 80 and 90 may be placed in physical and electrical contact with the end so as to serve as the conductive means. If the layers themselves are conductive but made from a material which positive and negative electrodes 20 and 30 respectively, would produce undesired electrochemical reactions within the battery, then some electrochemically non-reactive but electrically conductive means may be placed between the layers and the end positive and negative electrodes, and those intermediate means may be considered, either by themselves or in combination with the conductive layers as being the means needed to conduct the current between the exterior of the layers and the end electrodes. If the layers are electrically non-conductive, then the means must be provided inside the layers which are electrically connected to the end positive and negative electrodes and which extend through or around the edge of and to the exterior of the layers. The conductivity or non-conductivity of the window 7 will therefore also be influenced by the electrical characteristics of the liquid impervious layers 80 and 90, or any separate conductor means inside the wrapper which are in physical contact with the window, as well as by the conductivity or non-conductivity of those portions of the intercell connectors overlapped by the windows. In summary, wherever a window 7 is adhered to two separate, electrically conductive components and an electrical connection between the two is undesired, the window should be from a non-conductive material, but otherwise the window may be made from a conductive material.

The requirements of window 7 are that it not act as a wick which would itself conduct migrating liquids and also that it be adhesive on both of its sides when assembled in the battery. Contructions meeting this adhesive requirement include not only those which are adhesive before being placed into the battery, but also those which attain the necessary adhesive quality for the first time during the assembly of the battery. In the first category are a variety of adhesive films which may be used by themselves and a wide variety of adhesives which may be applied onto the surfaces of and impregnated into substrates selected from a broad range of materials; adhesive cements such as rubber base adhesives might be applied onto and possibly impregnated into such substrate materials as polyester and polyolefin. In the category of materials which attain their adhesive quality for the first time during assembly of the battery are ones in which the adhesive results from the application of pressure, heat, ultrasonics, or other forms of energy applied during battery assembly, as well as those in which the adhesion results from chemical reactions produced by the battery assembly; examples might include ethylene vinyl acetate based hot melt adhesives.

The window of this invention is not restricted to use with electrodes of particular construction. The active material in the electrodes may be of sheet or foil composition or it may comprise tiny particles either by themselves or in a porous binder matrix. The positive and negative electrodes shown in FIG. 3, while shown comprising tiny particles of active material, are illustrative of electrodes in general, regardless of their construction.

While it is preferred to employ the LeClanche electrochemical system (comprising manganese dioxide positive active material, zinc negative active material, and an electrolyte comprising ammonium chloride and/or zinc chloride), the multicell battery 5 employing the windows of this invention may employ a wide variety of positive and negative electrode materials and a wide variety of electrochemical system including both primary and secondary systems. Among the positive electrode materials are such commonly used inorganic metal oxides as manganese dioxide, lead dioxide, nickel oxyhydroxide, mercuric oxide, and silver oxide, inorganic metal halides such as silver chloride and lead chloride, and organic materials capable of being reduced such as dinitrobenzene and azodicarbonamide compounds. Among the negative electrode materials are such commonly used metals as zinc, aluminum, magnesium, lead, cadmium, and iron. This invention may empoly the electrolytes commonly used in the LeClanche system (ammonium chloride and/or zinc chloride), various alkaline electrolytes such as the hydroxides of potassium, sodium, and/or lithium, acidic electrolytes such as sulfuric or phosphoric acid, and nonaqueous electrolytes, the electrolytes, of course, being chosen to be compatible with the positive and negative electrodes.

Among the wide variety of electrochemical systems which may be used in the multicell battery 5 are those in which the positive electrodes comprise manganese dioxide, the negative electrodes comprise metals such as zinc, aluminum, or magnesium, and the electrolyte substantially comprises an acidic solution of inorganic salts. Another commonly known system useful in the battery 5 is the alkaline manganese system in which the positive electrode comprise manganese dioxide, the negative electrodes comprise zinc, and the electrolyte substantially comprises a solution of potassium hydroxide. Other aqueous electrolyte systems, including those of nickel-zinc, silver-zinc, mercury-zinc, mercury-cadmium, and nickel-cadmium, may also be used. Systems employing organic positive electrodes and acidic electrolytes may also be used including rechargeable systems using azodicarbonamide compound electrodes and LeClanche electrolyte.

Likewise, the window is not confined to use with specific electrolyte impregnated separators 40. The theoretical requirements of that component are that it contain electrolyte as well as physically separate and prevent contact between the electrodes. A deposit of gelled electrolyte could by itself serve both functions if of proper thickness and/or consistency. The alternative construction uses a deposit of gelled or fluid electrolyte with a separator which is distinct from and in addition to the electrolyte, the separator providing added insurance against direct contact between the electrodes and acting as an absorbent material into which the electrolyte may be impregnated. Both alternative constructions may, however, be viewed as being forms of electrolyte impregnated separators. Where the separator is distinct from and in addition to the electrolyte, the separator may be made from a wide variety of materials including the fibrous and cellulosic materials which are conventional in battery construction as well as from woven or non-woven fibrous materials such as polyester, nylon, polypropylene, polyethylene and glass.

We claim:
1. A multicell battery comprising the combination of:
   (a) at least two cells, each such cell comprising
      (i) a positive electrode,
      (ii) a negative electrode, and
      (iii) an electrolyte impregnated separator between the electrodes;
   (b) a liquid impervious intercell connector between each adjacent pair of cells, the edges of the intercell connector extending beyond the edges of the electrodes and separators of the adjacent cells;
   (c) a liquid impervious layer surrounding the cells and the intercell connectors; and,
   (d) a window surrounding each cell, each window being adhesive on both of its sides, each window having an opening defined by an inside perimeter which overlaps a portion of at least one intercell connector and having an outside perimeter which extends beyond the edges of the intercell connector to overlap and seal with the outside perimeter of at least one other such window, the inside perimeters of the windows providing first seals with the intercell connectors around the surrounded cells and the outside perimeters of the windows providing second seals around the surrounded cells.

2. The multicell battery of claim 1 in which the windows are electrically nonconductive.

3. The multicell battery of claim 2 in which the portions of the intercell connectors overlapped by the windows are electrically conductive.

4. The multicell battery of claim 2 in which the liquid impervious layer is electrically conductive.

5. The multicell battery of claim 3 in which the portions of the liquid impervious layers overlapped by the windows are conductive.

6. The multicell battery of claim 1 in which the edges of both the liquid impervious layer and the window extend beyond the edges of the intercell connector.

7. The multicell battery of claim 1 in which the outside perimeters of the window extend beyond the edges of the liquid impervious layer.

8. The multicell battery of claim 6 in which the outside perimeters of the window extend beyond the edges of the liquid impervious layer.

9. The multicell battery of claim 6 in which the liquid impervious layer extends beyond the peripheral edges of the negative electrodes comprise zinc active material, and the electrolyte comprises ammonium chloride and/or zinc chloride.

References Cited
UNITED STATES PATENTS

| | | | |
|---|---|---|---|
| 3,525,647 | 8/1970 | Strauss | 136—111 |
| 3,003,012 | 10/1961 | Duddy | 136—111 |
| 2,798,895 | 7/1957 | Nowotny | 136—111 |
| 3,353,999 | 11/1967 | Osborn | 136—111 |
| 3,390,014 | 6/1968 | Eisler | 136—10 |
| 3,306,777 | 2/1967 | Reid et al. | 136—111 |
| 2,870,235 | 1/1959 | Soltis | 136—111 |
| 3,421,944 | 1/1969 | Bauer | 136—83 R |
| 3,494,796 | 2/1970 | Grulke et al. | 136—6 |
| 2,745,894 | 5/1956 | Nowotny | 136—111 |
| 2,880,259 | 3/1959 | Nowotny | 136—111 |

WINSTON A. DOUGLAS, Primary Examiner

C. F. LEFEVOUR, Assistant Examiner